(12) United States Patent
Shin

(10) Patent No.: US 8,386,218 B2
(45) Date of Patent: Feb. 26, 2013

(54) WAVEFORM INVERSION IN LAPLACE-FOURIER DOMAIN

(75) Inventor: Changsoo Shin, Seoul (KR)

(73) Assignee: Shin's Geophysics, Seoul (KR)

( * ) Notice: Subject to any disclaimer, the term of this patent is extended or adjusted under 35 U.S.C. 154(b) by 966 days.

(21) Appl. No.: 12/436,400

(22) Filed: May 6, 2009

(65) Prior Publication Data

US 2010/0042391 A1 Feb. 18, 2010

Related U.S. Application Data

(60) Provisional application No. 61/050,887, filed on May 6, 2008.

(30) Foreign Application Priority Data

Aug. 29, 2008 (KR) ........................ 10-2008-0085356

(51) Int. Cl.
*G06G 7/48* (2006.01)
(52) U.S. Cl. .......................................................... 703/6
(58) Field of Classification Search .................. 702/14; 703/6
See application file for complete search history.

(56) References Cited

U.S. PATENT DOCUMENTS

| | | | |
|---|---|---|---|
| 6,865,489 B2* | 3/2005 | Jing | 702/16 |
| 2004/0186667 A1* | 9/2004 | Lee | 702/14 |
| 2007/0282535 A1* | 12/2007 | Sirgue et al. | 702/14 |
| 2009/0006054 A1* | 1/2009 | Song | 703/6 |

FOREIGN PATENT DOCUMENTS

| | | |
|---|---|---|
| KR | 1020080053005 A | 6/2008 |
| KR | 1020080114488 A | 12/2008 |

OTHER PUBLICATIONS

Vossen et al., Surface-consistent deconvolution using reciprocity and waveform inversion, Apr. 2006, GEOPHYSICS, vol. 71, No. 2, pp. V19-V30.*

* cited by examiner

*Primary Examiner* — Omar Fernandez Rivas
*Assistant Examiner* — Bernard E Cothran
(74) *Attorney, Agent, or Firm* — Rothwell, Figg, Ernst & Manbeck, P.C.

(57) ABSTRACT

Disclosed are an apparatus and method for visualizing subsurface velocity structure by processing signals through waveform inversion in the Laplace-Fourier domain, and a recording medium storing a program for implementing the method. A receiver receives a seismic signal from a target region, and a signal processor processes the seismic signal to generate image data for visualizing the subsurface structure of the target region. The signal processor performs the waveform inversion in the Laplace-Fourier domain, thereby obtaining a velocity model similar to an true structure of the target region.

17 Claims, 18 Drawing Sheets

(a) $\sigma = 0$ (b) $\sigma = 1$ (c) $\sigma = 10$ (d) $\sigma = 0$ (f) $\sigma = 10$ (a) 0.0

(b) 1.0

(c) 10.0

WAVEFORM INVERSION IN LAPLACE-FOURIER DOMAIN

CROSS-REFERENCE TO RELATED APPLICATION

This application claims the benefit under 35 U.S.C. §119 of Korean Patent Application No. 10-2008-0085356, filed on Aug. 29, 2008, and U.S. Provisional Application No. 61/050,887, filed on May 6, 2008, the disclosures of which are incorporated herein in their entities by reference.

BACKGROUND

1. Field

The following description relates to exploration geophysics technology, and more particularly, to a technology which visualizes subsurface velocity structure through signal processing using waveform inversion.

2. Description of the Related Art

Waveform inversion is a technique which estimates a subsurface velocity model using pre-stack seismic data.

Waveform inversion is a process which, after creating an initial model for a target region and obtaining a measured data in the target region, iteratively updates the initial model using the measured data to obtain a subsurface velocity model that is similar to the true subsurface structure. The waveform inversion is performed by computing modeled values from an initial velocity model by computer, and iteratively updating parameters representing physical properties of the subsurface until errors between the modeled values and the measured data obtained through actual field exploration are minimized.

Waveform inversion, a method for velocity analysis to achieve the goals of geophysical exploration, includes various mathematical methods. A representative waveform inversion method is a least squares method. With the development of computer technology, simple inversion is solved by a personal computer, and in most cases, certain prior information is applied to obtain an optimal solution since cases of obtaining a unique solution seldom occur. Here, it is an option to assign more importance on minimizing the error between the measured and modeled data or on obtaining a solution that is close to the prior information. Since an inversion model requires extreme assumptions as well as simplification in many cases, information about the geological and physical properties of the earth's interior is commonly used when a waveform inversion is performed.

One of the most important geological and physical properties of the earth's interior to delineate the subsurface is seismic propagation velocity. For example, to obtain the seismic propagation velocity of the subsurface, research is currently being conducted into artificially generating a wave in a target region that is to be measured, measuring a seismic wave in the target region, and performing waveform inversion in the time or frequency domain for the measured seismic data.

SUMMARY

The following description relates to an apparatus and method for visualizing subsurface velocity structure that enable efficient use of low-frequency components which are lack in field data in order to obtain a velocity model that is similar to the true subsurface structure, and a recording medium storing a program for implementing the method.

The method can be achieved by performing waveform inversion in the Laplace-Fourier domain.

A Laplace transform or a Fourier transform is used to transform a function of a certain variable into a function of a different variable, and is generally performed by integrating the original function that is multiplied by an exponential function. Here, in the Laplace transform, the exponent of an exponential function by which the original function is multiplied is real, while in the Fourier transform, the exponent of an exponential damping function by which the original function is multiplied is complex value that only has an imaginary part. That is, in one aspect, the Laplace-Fourier domain is a hybrid domain in which the exponent of an exponential function which is multiplied for transformation is a complex number.

For example, in one aspect, upon visualization of a subsurface structure, domain transformation for waveform inversion is performed by multiplying a measured time-domain signal by an exponential damping function and integrating the resultant value with respect to time. Here, the exponential damping function has a complex damping constant. As such, if waveform inversion is performed in the Laplace-Fourier domain using the complex number, all information about the amplitudes and phases of a damped wavefield can be used.

According to an aspect, there is provided an apparatus for visualizing subsurface velocity using waveform inversion in the Laplace-Fourier domain, including: a receiver which receives a seismic signal in a target region; and a signal processor which processes the seismic signal to generate image data for visualizing the subsurface structure of the target region, wherein the signal processor includes: an input unit receiving time-domain measured data from the receiver; a transformer transforming the time-domain measured data into Laplace-Fourier domain measured data using a complex damping constant; a modeled data generator setting up an equation including a parameter representing physical characteristics of the subsurface and solving the equation in the Laplace-Fourier domain to obtain modeled data; and a parameter update unit updating the parameter by comparing the Laplace-Fourier domain measured data with the modeled data.

The damping constant includes a Laplace damping constant as a real part and an angular frequency as an imaginary part.

The parameter includes a velocity model, a velocity/density model or an impedance/density model for the target region.

The parameter update unit generates an objective function representing a misfit between the Laplace-Fourier-domain measured data and the modeled data, and updates the parameter in order to minimize the objective function. The objective function is defined by logarithms of the Laplace-Fourier domain measured data and the modeled data.

The objective function is defined using values obtained by taking the Laplace-Fourier domain measured data and the modeled data to the power of p, or values obtained by integrating the power of p of the Laplace-Fourier domain measured data and the modeled data with respect to p. p is equal to or less than 1.0.

The signal processor further comprises an image processor generating image data of the target region using the updated parameters, and displaying the image data on a display device.

According to another aspect, there is provided a method for processing seismic data received in a target region to visualize the subsurface structure of the target region, the method including: receiving measured time-domain data in the target region; transforming the measured time-domain data into the measured Laplace-Fourier-domain data using a complex damping constant; setting up an equation including parameters representing physical characteristics of the target region and solving the equation in the Laplace-Fourier domain to obtain modeled data; and updating the parameter by comparing the measured Laplace-Fourier-domain data with the modeled data.

According to another aspect, there is provided a method for visualizing subsurface velocity using a waveform inversion in the Laplace-Fourier domain, including: performing a waveform inversion in the Laplace-Fourier domain to find a velocity model having a medium-wavelength component or a long-wavelength component of a target region that is to be inverted; and performing waveform inversion in a frequency domain using the velocity model to find a velocity model having a short-wavelength component of the target region.

The performing of the waveform inversion in the Laplace-Fourier domain comprises transforming a time-domain measured wavefield obtained from a target region into a Laplace-Fourier domain wavefield using a complex damping constant.

According to another aspect, there is provided a recording medium storing a program, the program including: receiving measured time-domain data; transforming the measured time-domain data into measured Laplace-Fourier-domain data using a complex damping constant; setting up an equation including an initial parameter and solving the equation in the Laplace-Fourier domain to obtain modeled data; defining an objective function representing a misfit between the measured data and the modeled data; and updating the parameter to minimize the objective function.

According to the apparatus and method for visualizing subsurface velocity, and the recording medium storing the program for implementing the method, since the waveform inversion is performed in the Laplace-Fourier domain, all the zero-frequency and low-frequency components of a damped wavefield can be used, and thus a velocity model having long-wavelength and medium-wavelength information can be stably obtained.

Moreover, since a velocity model obtained by performing the waveform inversion in the Laplace-Fourier domain can be used as an initial velocity model for waveform inversion in the frequency- or time-domain, a velocity model similar to an actual subsurface structure can be obtained.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
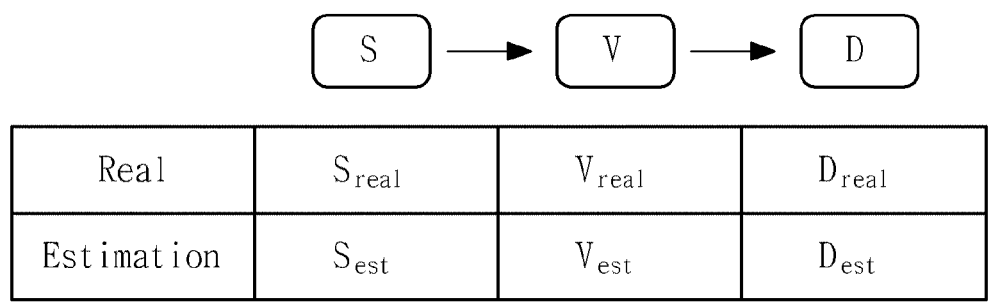
FIG. 1 is a view for explaining a waveform inversion principle according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. Like reference numerals in the drawings denote like elements.

Waveform inversion according to an exemplary embodiment of the present invention is a process which deduces information (for example, velocity model or density model of a target region that is to be inverted) about subsurface structure based on the measured data in a field. The waveform inversion can include a modeling process in which an analyzer sets up an initial velocity model and obtains a modeled value for the subsurface velocity model.

For example, when subsurface structure is updated using waveform inversion according to the exemplary embodiment, by comparing modeled values computed through modeling with measured values obtained through actual field exploration to create a new subsurface velocity model, and iteratively comparing modeled values of the new subsurface velocity model with the measured values obtained through actual field exploration to minimize a misfit there between, an subsurface velocity model which is close to the true subsurface velocity model can be obtained.

The waveform inversion according to the exemplary embodiment can be implemented by a computation apparatus for processing a variety of signals to generate image data for visualizing subsurface structure of a target region, a computer-readable recording medium on which signal processing algorithms are recorded, and a method for visualizing subsurface structure through the computation apparatus or the recording medium, etc.

A waveform inversion principle according to an exemplary embodiment of the present invention will be described with reference to FIG. 1, below.

In FIG. 1, V denotes physical characteristics of the subsurface structure, S denotes an input applied to V, and D denotes an output when S is applied to V.

The waveform inversion is aimed at finding the characteristic value V of the subsurface structure using a measured value D. If a velocity distribution (that is, a seismic wave velocity model) among the characteristics of the subsurface structure is obtained, the subsurface structure can be easily visualized using the velocity distribution. For this reason, it is assumed that the characteristic V is a velocity distribution, the input S is a source, and the output D is seismic data.

Measured seismic data $D_{real}$ can be actually obtained through actual field exploration of a target region, and estimated seismic data $D_{est}$ can be obtained from estimated values ($V_{est}$, $S_{est}$) obtained by modeling of the target region. By updating initially estimated velocity data $V_{est}$ and source data $S_{est}$ and iteratively performing the updating process, a difference between the measured seismic data $D_{real}$ and the estimated seismic data $D_{est}$ is minimized and an estimated velocity distribution $V_{est}$ is equalized to an actual velocity distribution $V_{real}$. Here, V representing subsurface structure can represent only a velocity distribution as described above or it can represent velocity/density, impedance, Lame constant/density distribution.

Figure 2:
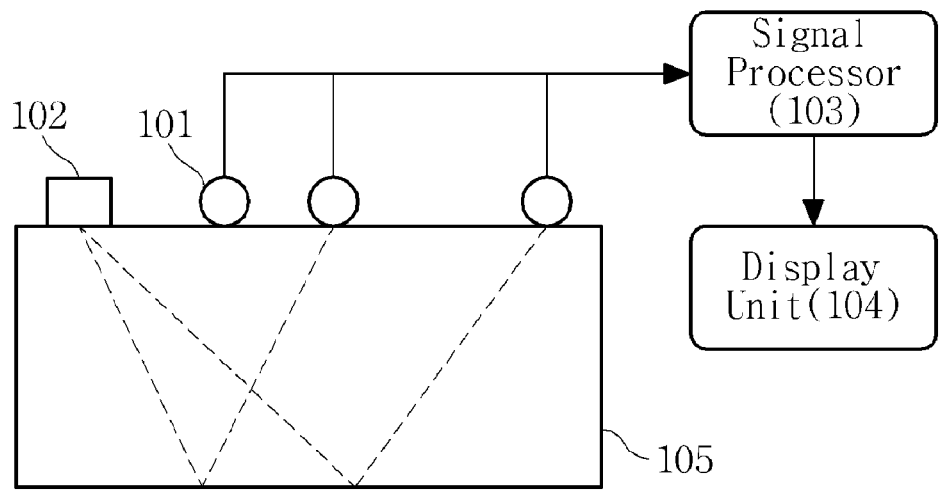
FIG. 2 is a view for explaining a subsurface velocity visualization apparatus according to an exemplary embodiment of the present invention.

FIG. 2 is a schematic diagram for explaining a subsurface velocity structure visualization apparatus according to an exemplary embodiment of the present invention.

Referring to FIG. 2, the subsurface velocity structure visualization apparatus according to an exemplary embodiment of the present invention can include a source 102, a receiver 101, a signal processor 103, and a display unit 104.

The source 102 can generate a wave to a target region 105, and the receiver 101 can receive a seismic signal propagating through the target region 105. The signal processor 103 receives the seismic signal from the receiver 101, and processes the received seismic signal to generate image data so that the subsurface velocity structure of the target region 105 can be displayed through the display unit 104.

The signal processing performed by the signal processor 102 uses the waveform inversion described above, and the signal processor 103 performs the waveform inversion in the Laplace-Fourier domain. For example, the signal processor 103 performs domain transformation by multiplying a time-domain input by an exponential damping function $e^{-st}$ with a complex damping constant s and integrating the result of the multiplication with respect to time.

The Laplace-Fourier domain for the waveform inversion of the signal processor 103 will be described below in detail.

The Laplace-Fourier transform for a time-domain wavefield can be expressed by Equation 1:

$$d(s) = \int_0^\infty d(t)e^{-st} dt = \int_0^\infty d(t)e^{-i\omega t}e^{-\sigma t} dt, \quad (1)$$

where d(s) denotes data which is transformed to the Laplace-Fourier domain, d(t) denotes time-domain data, and s is a damping constant. The damping constant s is a complex number, which consists of a Laplace damping constant σ as a real part and an angular frequency ω as an imaginary part.

In Equation 1, if the damping constant s is real, the transformation is identical to the typical Laplace transform, and if the transformation is applied to the waveform inversion according to the exemplary embodiment, a zero-frequency component of a damped wavefield can be used.

In Equation 1, if the damping constant s is complex, the transformation is to a hybrid domain and is referred to as "the Laplace-Fourier transform" in this specification in order to distinguish it from the typical Laplace transform. That is, the Laplace-Fourier transform can be considered as an extension of the Laplace transform, and the waveform inversion in the Laplace-Fourier domain uses both low-frequency components and a zero-frequency component of a damped wavefield.

In order to compare a wavefield of the Laplace domain with a wavefield of the Laplace-Fourier domain, if it is assumed that a wavefield in the time domain is v(t), v(t) can be expressed by Equation 2:

$$v(t) = a_1 \cos(\omega_c t) + b_1 \sin(\omega_s t) \quad (2)$$

If the time-domain wavefield v(t) is transformed using Equation 1, the transformed wavefield can be expressed by Equation 3:

$$\begin{aligned} v(s) &= \int_0^\infty v(t)e^{-st} dt \\ &= \int_0^\infty a_1 \cos(\omega_c t)e^{-st} dt + \int_0^\infty b_1 \sin(\omega_s t)e^{-st} dt \\ &= a_1 \frac{s}{s^2 + \omega_c^2} + b_1 \frac{\omega_s}{s^2 + \omega_s^2} \\ &= a_1 \frac{\sigma + i\omega}{\sigma^2 + 2i\sigma\omega - \omega^2 + \omega_c^2} + b_1 \frac{\omega_s}{\sigma^2 + 2i\sigma\omega - \omega^2 + \omega_s^2} \end{aligned} \quad (3)$$

It can be understood in Equation 3 that the Laplace-Fourier transformed wavefield v(s) is a function of an amplitude ($a_1$ and $b_1$) and phase ($\omega_c$ and $\omega_s$) of the time-domain wavefield v(t). For convenience of description, if it is assumed that $b_1$ and $\omega_s$ are zero and $\omega_c$ is 20.0 or 40.0, the Laplace-Fourier transform v(t) can be expressed as shown in FIG. 3.

Figure 3:
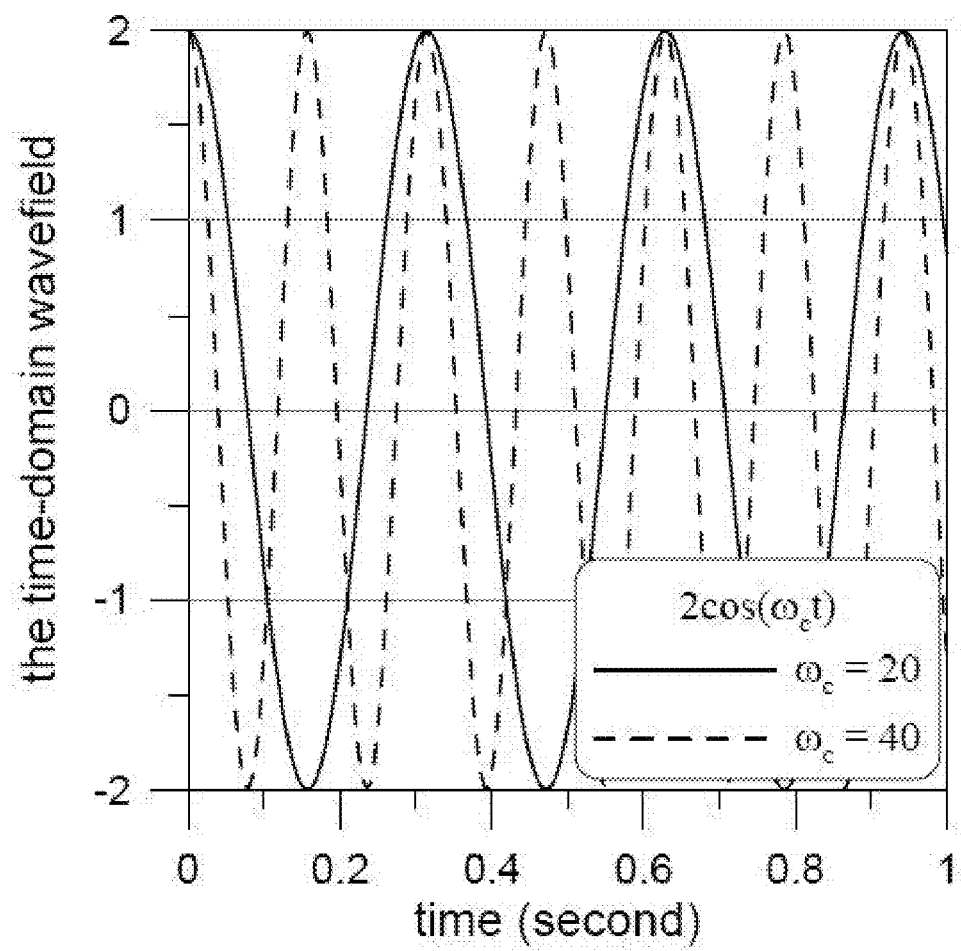
FIG. 3 is a graph showing measured data obtained in field according to an exemplary embodiment of the present invention.
Figure 4:
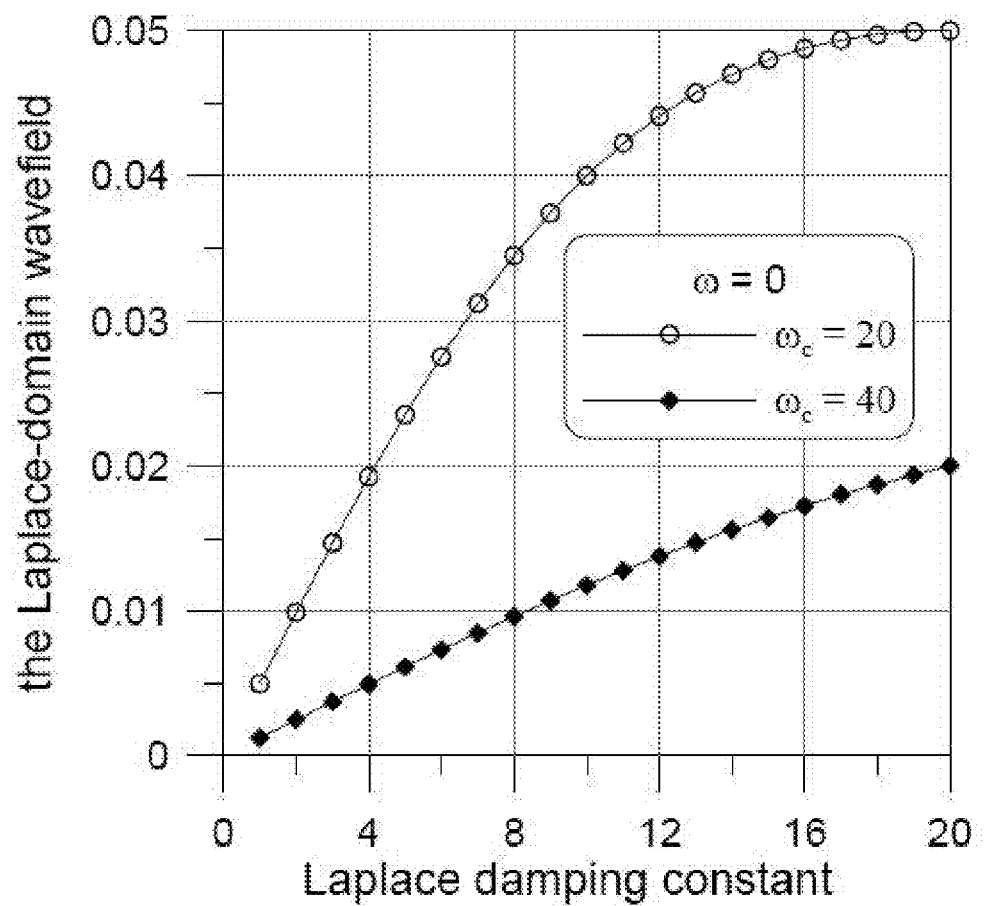
FIGS. 4, 5 and 6 are graphs showing results obtained by Laplace- and Laplace-Fourier-transforming the measured data of FIG. 3.

FIG. 4 shows a result obtained by the Laplace-transformation of the time-domain wavefield of FIG. 3, wherein s is a real number. As shown in FIG. 4, the amplitude of the wavefield increases as the Laplace damping constant increases, and the slopes of two curves are different according to the angular frequency of the wavefield.

Figure 5:
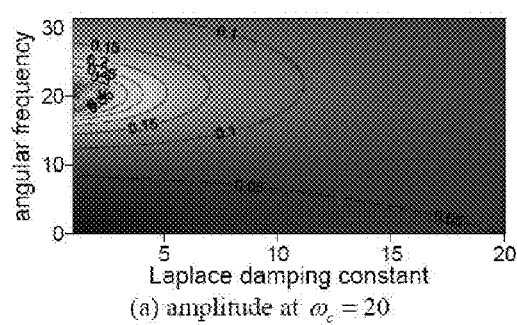
Figure 6A:
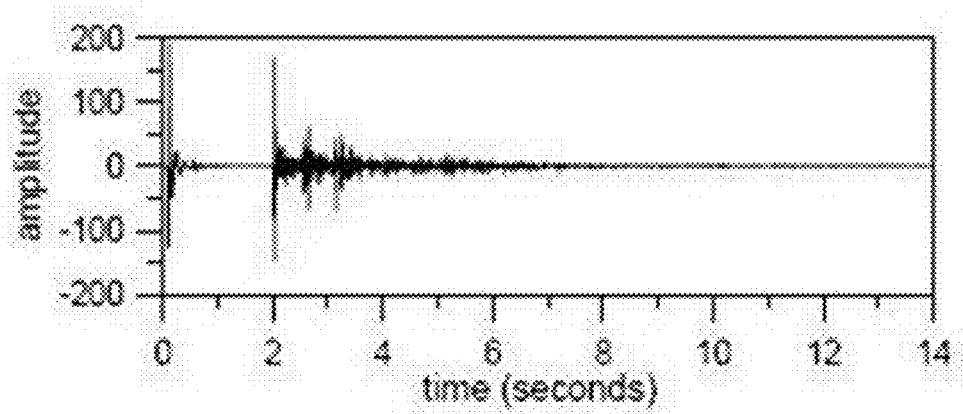
Figure 6B:
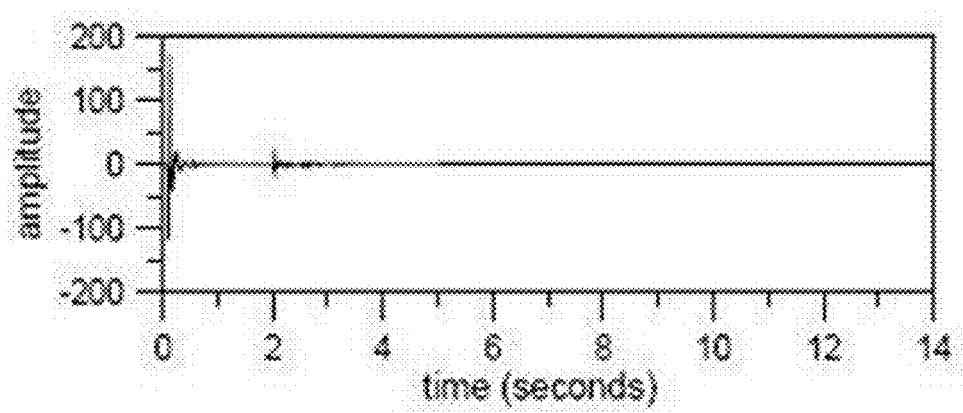
Figure 6C:
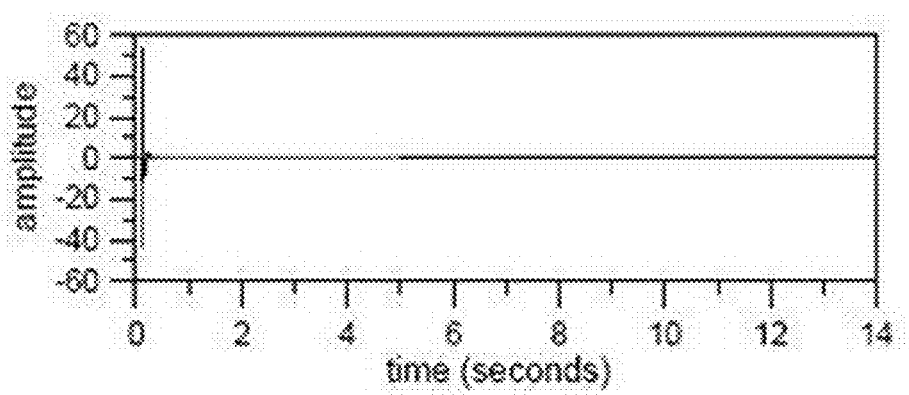
Figure 6D:
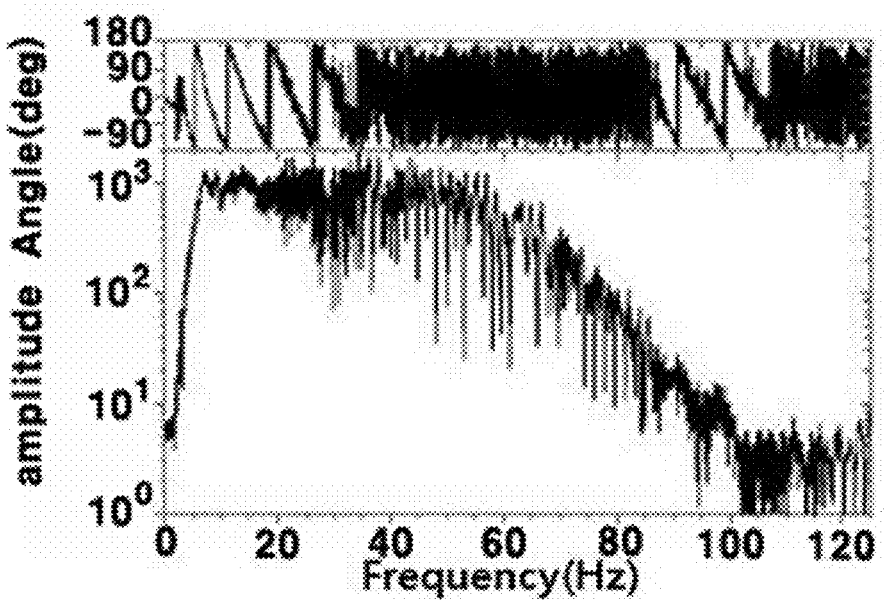
Figure 6E:
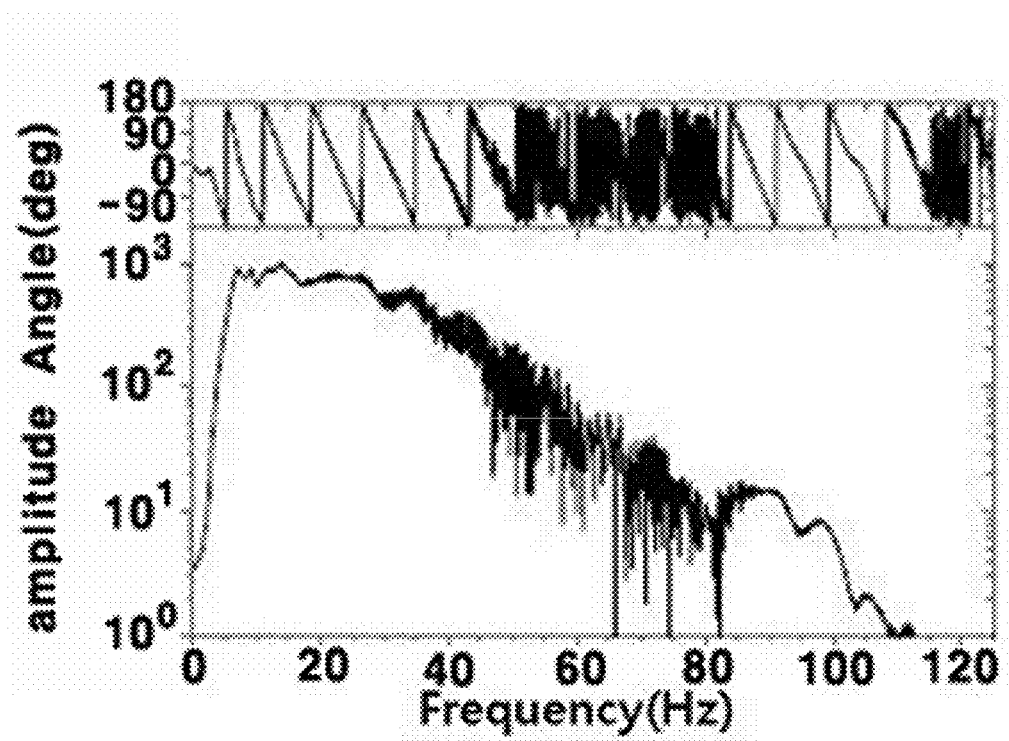
Figure 6F:
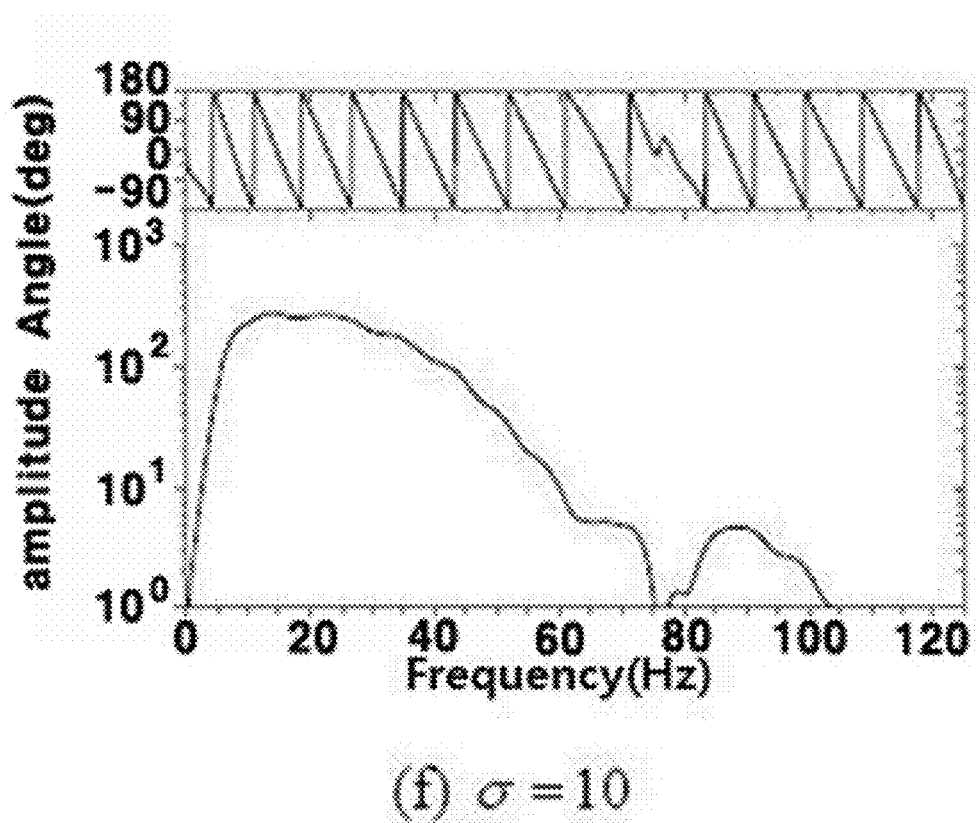

FIG. 5 shows results obtained by Laplace-transforming the wavefield of FIG. 3, wherein s is a complex number. As shown in FIG. 5, unlike FIG. 4, both amplitude and phase are shown in a contour-like form.

As shown in FIG. 5, both the amplitude and the phase of the damped wavefield have peak spectrums of v(t) at 20 and 40, but also spread out to the nearby main frequency band. This indicates that when we use the damped wavefield of field data, which do not generate low-frequency components below 5 Hz for the waveform inversion, we can use "mirage-like" low-frequency components of the damped wavefield. Therefore, the waveform inversion in the Laplace-Fourier domain can obtain a velocity model including long-wavelength information using the low-frequency components.

FIG. 6 shows the Laplace-Fourier-domain wavefields when different Laplace damping constants σ are used. (a), (b) and (c) of FIG. 6 represent time-domain wavefields, and (d), (e) and (f) of FIG. 6 show frequency spectrums of Laplace-Fourier-domain wavefields, respectively. As shown in FIG. 6, as the Laplace damping constant increases, the amplitude and phase spectrums are smoothly attenuated. Particularly, the phase spectrum of 0 Hz to 5 Hz which is important in the waveform inversion notably changed with the Laplace damping constant.

Generally, waveform inversion has been performed in the time or frequency domain. However, since low-frequency components of field data are not reliable, there is a limitation in obtaining long wavelength information from field data. However, if waveform inversion is performed in the Laplace domain or the Laplace-Fourier domain as described above, low-frequency components near zero frequency can be used so that accurate information on subsurface velocity structure can be obtained.

If waveform inversion is performed in the Laplace domain, there is an advantage of obtaining long wavelength information using a zero-frequency component of the damped wavefield. However, since the penetration depth of the inversion is very sensitive to a maximum offset of seismic exploration data and a Laplace damping constant, the waveform inversion in the Laplace domain merely provides a velocity model in a smooth form.

Accordingly, in the current exemplary embodiment, waveform inversion is performed in the Laplace domain, but the waveform inversion is performed in the hybrid domain of the Laplace-Fourier domain using a complex damping constant.

For example, when the signal processor 103 processes data using waveform inversion in order to visualize subsurface velocity structure of a target region, the signal processor 103 first performs waveform inversion in the Laplace-Fourier domain to find a medium-wavelength or long-wavelength component for a velocity model of a target region, sets the velocity model as an initial velocity model for waveform inversion in the frequency domain, and performs frequency-domain waveform inversion to find a short-wavelength component for the velocity model.

Figure 7:
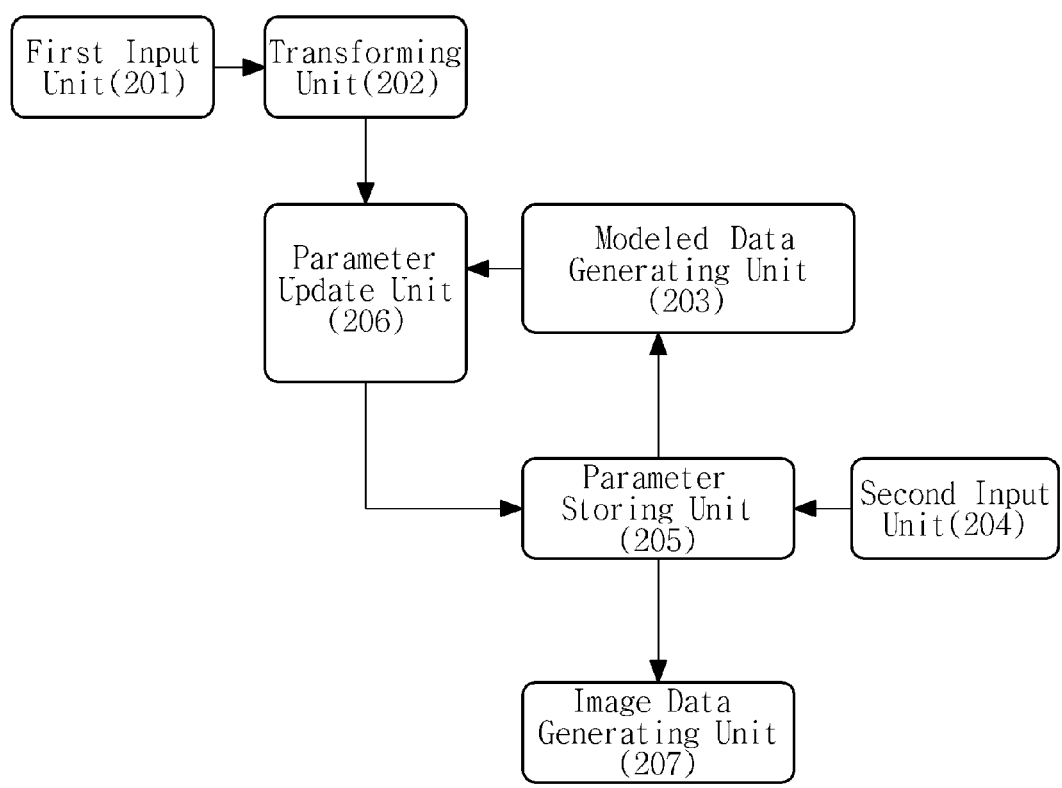
FIG. 7 is a block diagram of a signal processor according to an exemplary embodiment of the present invention.

FIG. 7 is a block diagram of the signal processor 103 according to an exemplary embodiment of the present invention.

A first input unit 201 is connected to the receiver 101 to receive time-domain data of the target region. The first input unit 201 transmits the received time-domain data to a transforming unit 202. For example, data which is transmitted from the first input unit 201 to the transforming unit 202 can be expressed by the above Equation 2.

The transforming unit 202 transforms the received time-domain data into Laplace-Fourier domain data. For example, the transforming unit 202 can transform the time-domain data into Laplace-Fourier-domain data using the complex damping constant as in Equation 1.

A modeled data generating unit 203 generates modeled data of the target region. For example, if parameters representing physical characteristics of the target region is input to a second input unit 204, a parameter storing unit 205 stores the parameters, and the modeled data generating unit 203 receives the parameters stored in the parameter storing unit 205, sets up an equation including the parameters, and solves the equation in the Laplace-Fourier domain to generate modeled data.

That is, an output of the transforming unit 202 means measured data, and an output of the modeled data generating unit 203 means estimated data.

A parameter update unit 206 compares an output (that is, measured data in the Laplace-Fourier domain of the transforming unit 202) of the transforming unit 202 with an output (that is, modeled data of the Laplace-Fourier domain) of the modeled data generating unit 203, thus updating the parameter stored in the parameter storing unit 205. At this time, the parameter update unit 206 can update the previously stored parameter to minimize a difference between the measured data and the modeled data.

The process will be described below in detail using equations.

The modeled data generating unit 203 can express a wave equation including parameters representing the characteristics of the target region as Matrix Equation 4, using a finite element method (FEM) or a finite difference method (FDM):

$$M\ddot{u} = C\dot{u} + K\dot{u} = f, \quad (4)$$

where M denotes a mass matrix, C denotes a damping matrix, K denotes a stiffness matrix, u denotes a time-domain wavefield, f denotes a source vector, and • denotes differentiation with respect to time. Here, M, C and K are functions of the parameters representing physical characteristics of the target region.

If a solution u of Equation 4 is obtained, u can be modeled data of the target region. In order to obtain the solution in the Laplace-Fourier domain, Equation 4 can be transformed as follows:

$$S\tilde{u} = \tilde{f}, \quad (5)$$

$$S = Ms^2 + Cs + K$$

$$\tilde{u} = \int_0^\infty u(t)e^{-st}\,dt$$

$$\tilde{f} = \int_0^\infty f(t)e^{-st}\,dt,$$

The solution of Equation 5 in the Laplace-Fourier domain can be simply obtained by factoring a complex impedance matrix S and performing a forward or backward substitution method or an iterative matrix solving method with respect to a source vector.

Then, the parameter update unit 206 compares u(s) obtained by the modeled data generating unit 203 with d(s) obtained by the transforming unit 202 to update the parameter stored in the parameter storing unit 205 so that the difference between u(s) and d(s) can be minimized. That is, the parameter can be updated in such a manner as to define an objective function E representing the difference between d(s) and u(s) and minimize the objective function E.

For example, a difference between d(s) and u(s) with respect to an i-th Laplace-Fourier frequency of a k-th receiver by a j-th source can be expressed using logarithms by Equation 6:

$$\delta r_{ijk} = \ln(u_{ijk}) - \ln(d_{ijk}) = \ln\left(\frac{u_{ijk}}{d_{ijk}}\right) \quad (6)$$

The objective function E can be defined by Equation 7:

$$E = \sum_{i=1}^{n_f} \sum_{i=1}^{n_s} \sum_{j=1}^{n_r} \delta r_{ijk} \delta r_{ijk}^*, \quad (7)$$

where $n_f$ denotes the number of frequencies for inversion, $n_s$ and $n_r$ denote the number of sources and receivers, respectively, and * denotes a complex conjugate.

Updating the parameter by minimizing the objective function E can be performed by a steepest descent method, and the steepest descent direction of an m-th model parameter $p_m$ for a given complex frequency can be expressed by Equation 8:

$$\nabla_m E = \frac{\partial E}{\partial p_m} = Re\left[\sum_{j=1}^{n_s}(v_m)^T S^{-1} r_j\right], \quad (8)$$

$$v_m = -\frac{\partial S}{\partial p_m}\tilde{u}_j,$$

$$r_j = \begin{Bmatrix} \ln(u_{j1}/d_{j1})^*/u_{j1} \\ \ln(u_{j2}/d_{j2})^*/u_{j2} \\ \vdots \\ \ln(u_{jnr}/d_{jnr})^*/u_{jnr} \\ 0 \\ \vdots \\ 0 \end{Bmatrix}$$

Equation 8 is normalized using a diagonal element of the pseudo-Hessian matrix which uses a virtual source vector, and parameters can be updated using the obtained steepest descent direction as follows:

$$p_m^{l+1} = p_m^l - \alpha \sum_{i=1}^{n_f} NRM\left(\frac{Re\left[\sum_{j=1}^{n_s}(v_m)^T S^{-1} r_j\right]}{Re\left[\sum_{j=1}^{n_s}(v_m)^T v_m^*\right]+\lambda}\right) \quad (9)$$

where NRM denotes normalization, $p_m^l$ denotes an m-th model parameter which is once iterated, $\lambda$ denotes a damping factor, and $\alpha$ denotes a scale coefficient of a step length.

Model parameters which minimize the objective function E can be obtained by iteratively summing a scaled update increment of the steepest descent direction, starting from an initial parameter, as described above.

Since the parameters which minimize the objective function E can be regarded as identical to the physical characteristics of the target region through updating, an image data generating unit 207 can generate image data of the target region using the finally updated parameters.

Alternatively, the objective function E can be defined using a difference between the p-th power of d(s) and the p-th power of u(s), or using a difference of integrals of the p-th power of d(s) and the p-th power of u(s) with respect to p, wherein p can be smaller than 1.0. Also, any other numerical analysis techniques which minimize the objective function E can be used.

Figure 8:
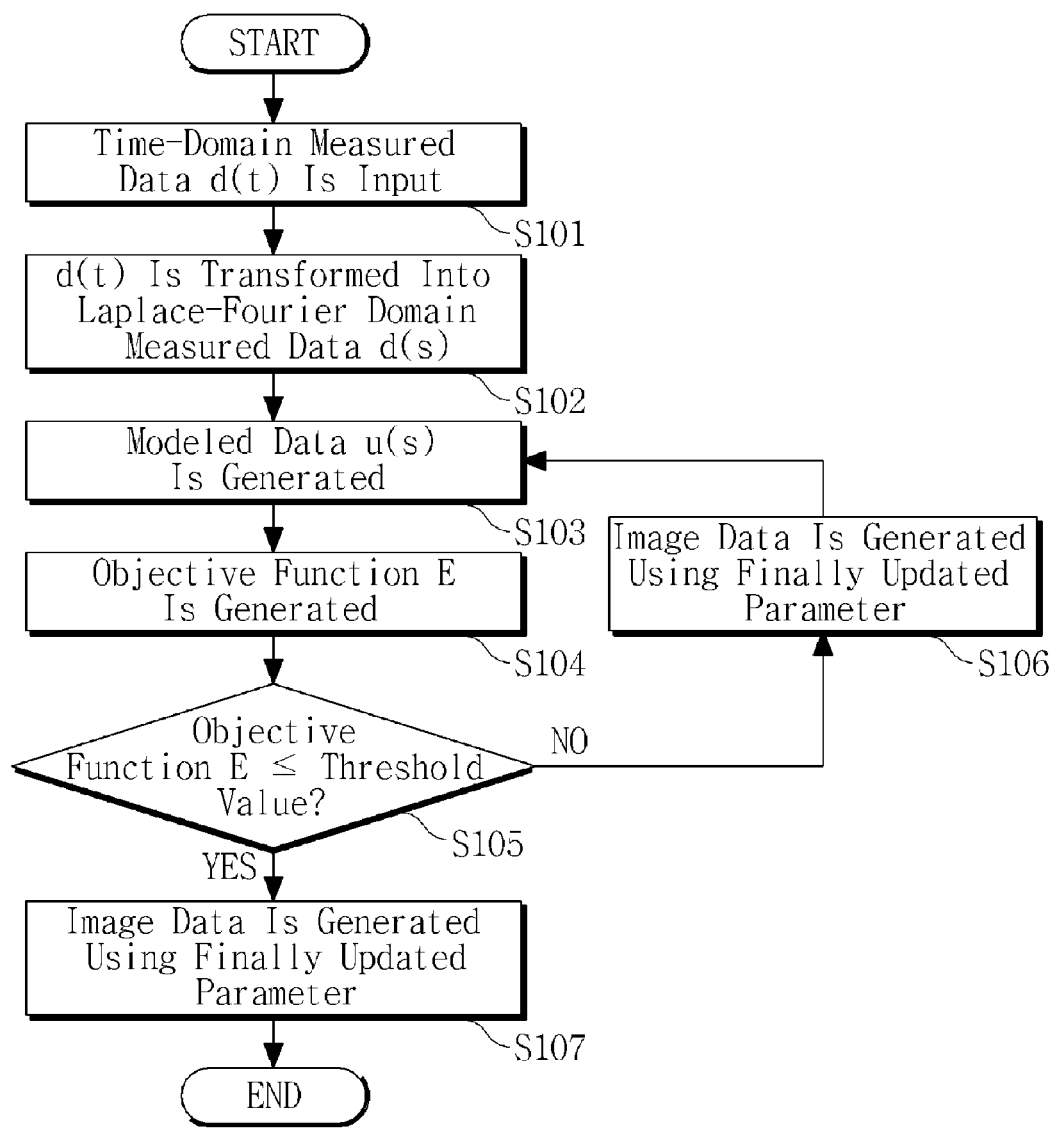
FIG. 8 is a flowchart illustrating a method for imaging subsurface velocity according to an exemplary embodiment of the present invention.

FIG. 8 is a flowchart of a subsurface velocity structure visualization method according to an exemplary embodiment of the present invention.

The subsurface velocity structure visualization method can be executed by the subsurface velocity structure imaging apparatus, or can be implemented in the form of a program stored on a recording medium which can be executed in a subsurface velocity structure visualization apparatus.

Referring to FIG. 8, in operation S101, measured data is received from the target region in step S101. The measured data may be seismic data propagated in the target region and can be expressed using a time-domain wavefield like Equation 2.

Then, in operation S202, the measured data is transformed to data in the Laplace-Fourier domain. The transformation process can be performed using Equation 1, and a complex number which includes a Laplace damping constant and angular frequency can be used as a damping constant s upon the transformation.

Then, in operation S103, a target region is modeled in step S103. For example, a matrix equation such as Equation 5 is set using parameters which represent characteristics of the target region, and Equation 5 is solved to generate modeled data. In operation S103, a process for receiving initial parameters for the target region can be additionally performed.

Subsequently, in operation S104, the objective function representing a difference between the measured data and the modeled data in the Laplace-Fourier domain is generated in step S104. For example, the objective function can be defined using a logarithmic value of each data like Equations 6 and 7. Alternatively, the objective function can be defined using the p-th power of each data or an integral of the p-th power of each data with respect to p.

Next, the initial parameters are iteratively updated to minimize the objective function in operations S105 and 106. Updating the parameters can be iterated until an objective function generated using the updated parameters is compared with and determined as equal to or less than a predetermined threshold value.

For example, if the objective function is determined as equal to or less than the predetermined threshold value in operation S105, operation S107 is performed, and if not, the parameters for generating the modeled data are updated in operation S106. At this time, the parameters can be updated to minimize the objective function.

When the parameters are finally updated through the above-described process, image data of the target region is generated using the parameters in operation S107. For example, when a velocity model of the target region is used as a parameter, the image data can be generated based on a velocity model which is finally obtained by iteratively updating the velocity model.

Figure 9:
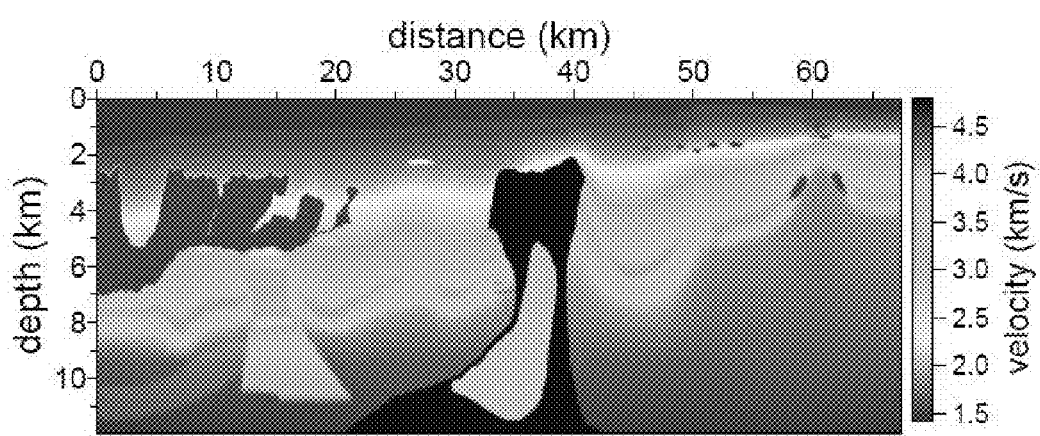
FIG. 9 shows a P-wave velocity model of the BP model according to an exemplary embodiment of the present invention.

FIG. 9 shows a P-wave velocity model of a BP model according to an exemplary embodiment of the present invention.

Here, the BP model, which is disclosed in "The 2004 BP Velocity Benchmark" by F. J. Billette and S. Brandsberg Dahl, is a virtual subsurface velocity structure model which is used to inspect subsurface exploration technologies. That is, when it is assumed that the target region has a structure of FIG. 9, the effectiveness of the subsurface exploration technology can be tested by determining whether a structure which is identical or similar to that of FIG. 9 is obtained from measured data (this can be obtained from a data set of the BP model).

Figure 10:
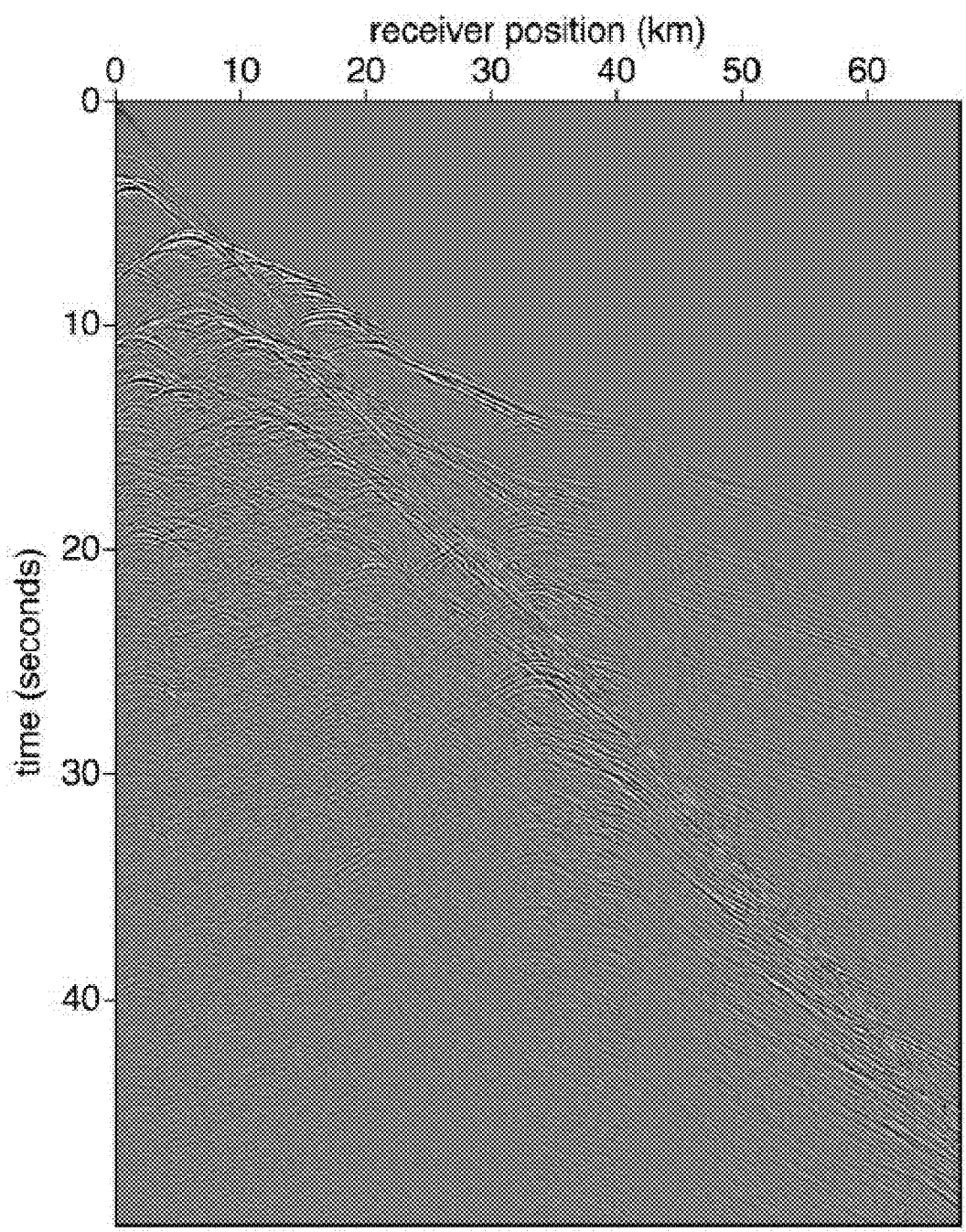
FIG. 10 shows a time-domain wavefield for the BP model of FIG. 9.

FIG. 10 shows a time-domain wavefield of the BP model.

FIG. 10 can be derived from an artificial data set of the BP model. For example, FIG. 10 corresponds to a seismogram obtained through field exploration of the target region.

Figure 11A:
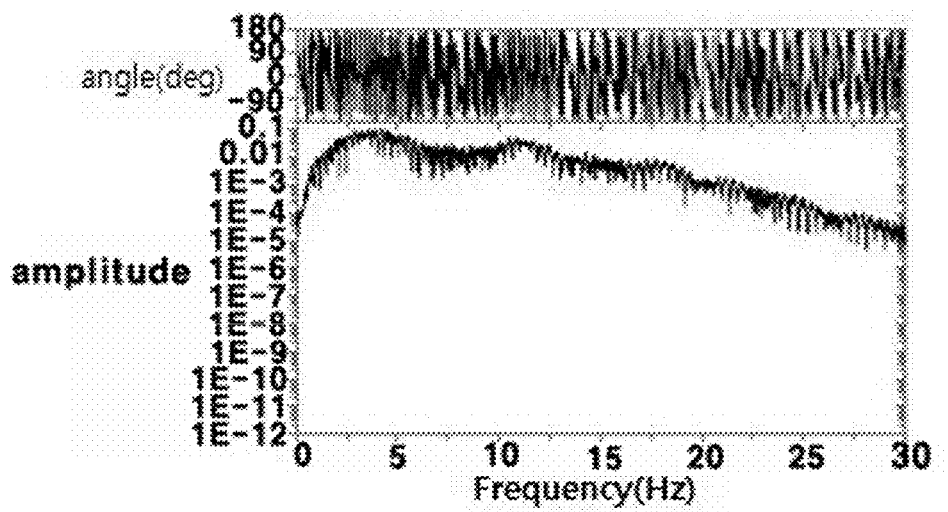
FIG. 11 shows a wavefield in the Laplace-Fourier domain with respect to FIG. 10.
Figure 11B:
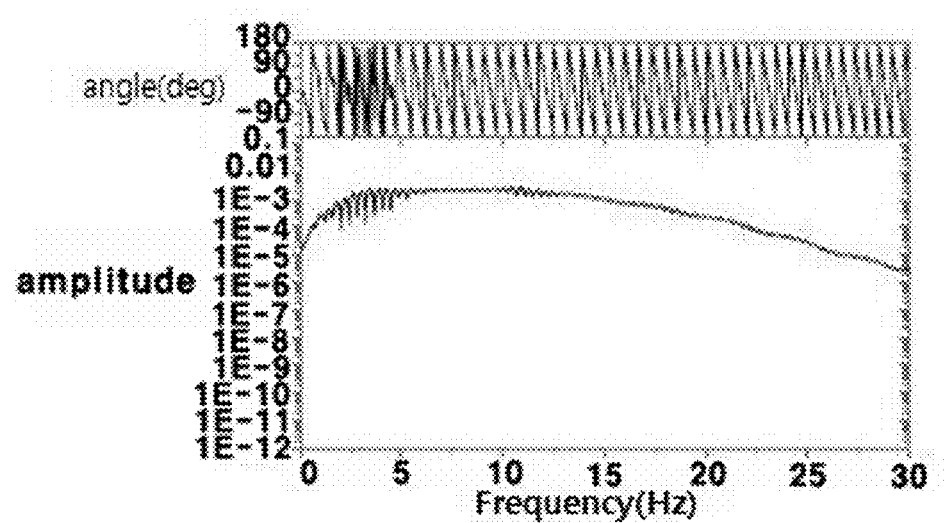
Figure 11C:
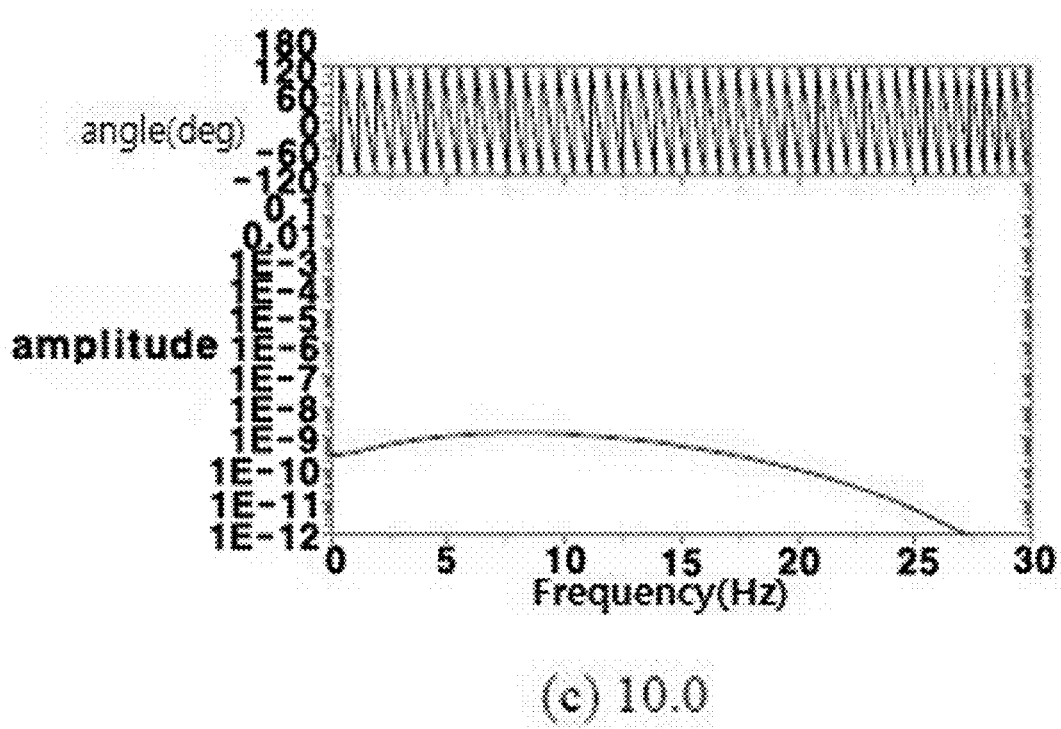

FIG. 11 shows a wavefield in the Laplace-Fourier domain with respect to FIG. 10.

(a), (b) and (c) of FIG. 11 correspond to the cases where the Laplace damping constants σ are 0, 1 and 10, respectively. As the Laplace damping constant σ increases, the amplitude and phase spectrums of the Laplace-Fourier wavefield gradually smooth out.

Figure 12:
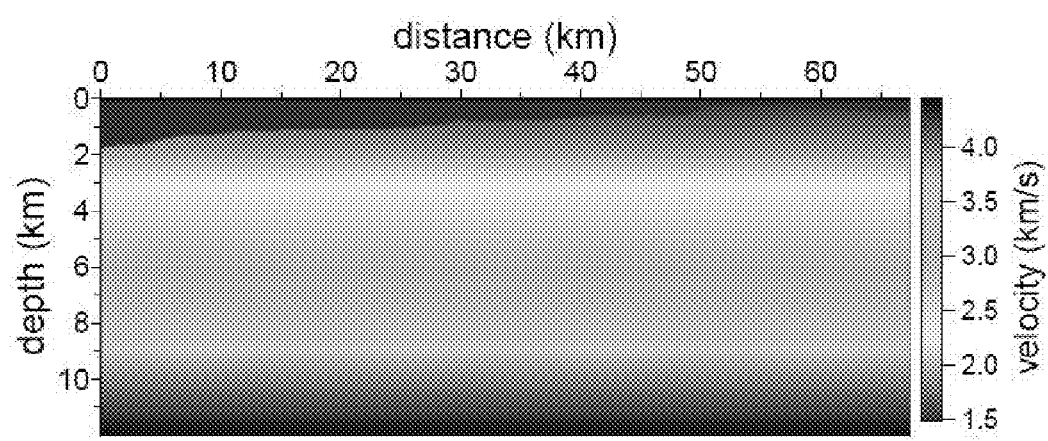
FIG. 12 shows an initial velocity model according to an exemplary embodiment of the present invention.

FIG. 12 shows an example of an initial velocity model for a waveform inversion.

Referring to FIG. 12, the initial velocity model is set to have a linear velocity distribution according to depth.

Figure 13:
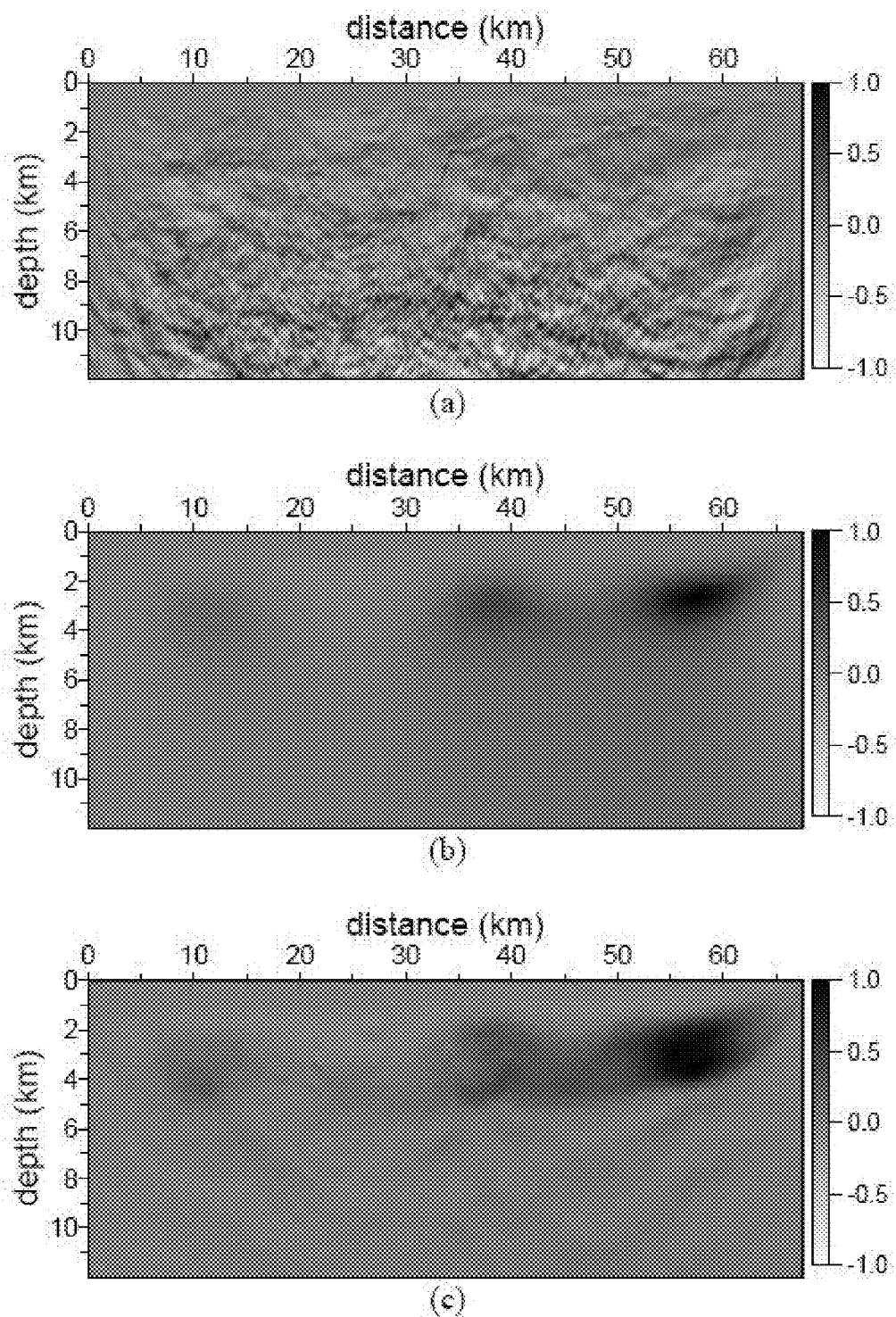
FIG. 13 shows steepest descent directions in the frequency domain, the Laplace domain, and the Laplace-Fourier domain, respectively.

(a), (b) and (c) of FIG. 13 show the steepest descent directions in the frequency domain, the Laplace domain, and the Laplace-Fourier domain, respectively.

In detail, (a) of FIG. 13 shows the steepest descent direction in the frequency domain, corresponding to short-wavelength information, (b) of FIG. 13 shows the steepest descent direction in the Laplace domain, corresponding to long-wavelength information, and (c) of FIG. 13 shows the steepest descent direction in the Laplace-Fourier domain, corresponding to medium-wavelength information which is a wavelength shorter than that of (b) of FIG. 13.

Figure 14:
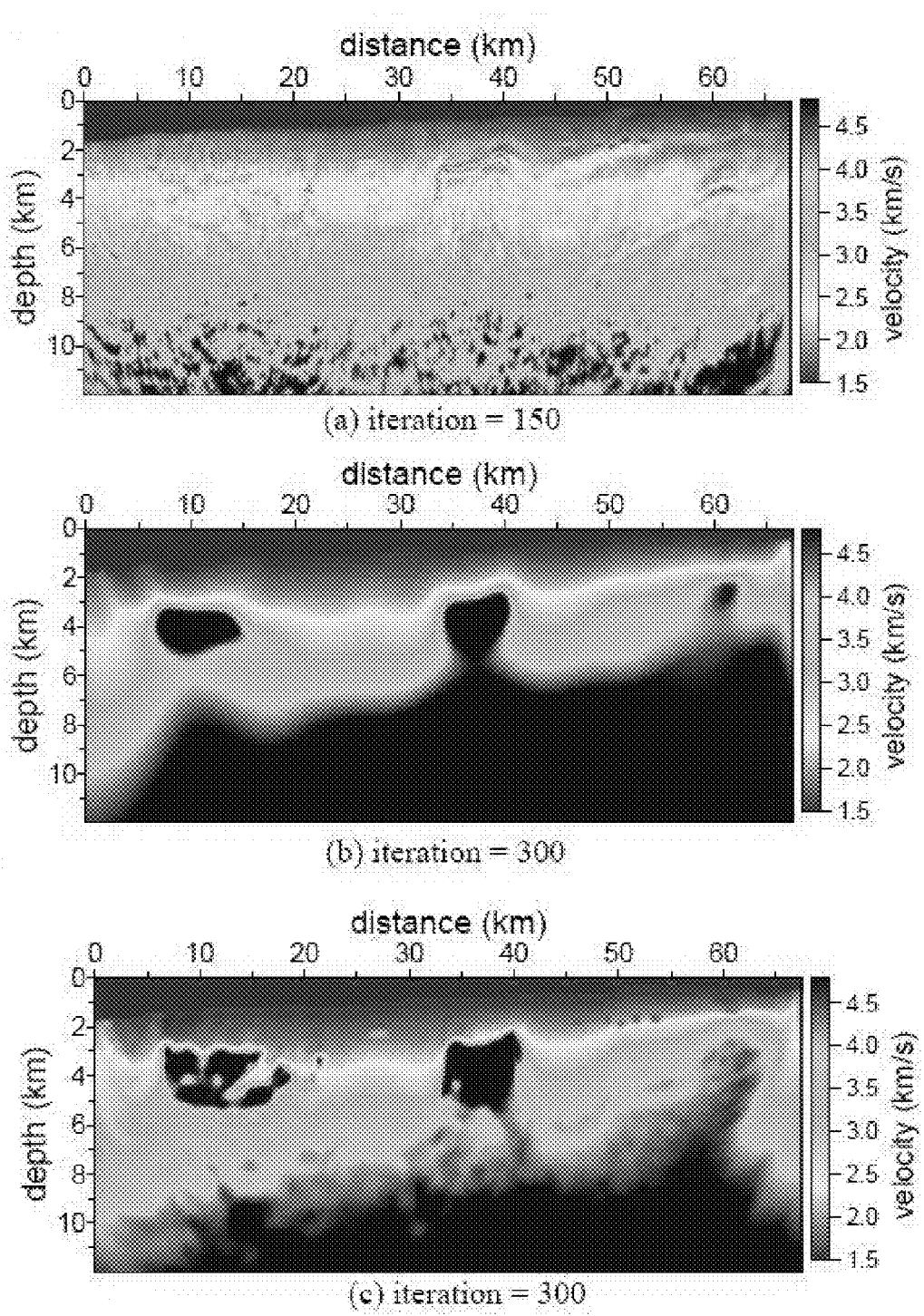
FIG. 14 shows examples of velocity models finally updated through waveform inversion in the frequency domain, in the Laplace domain, and in the Laplace-Fourier domain, respectively.

(a) of FIG. 14 shows a velocity model finally updated through waveform inversion in the frequency domain, (b) of FIG. 14 shows a velocity model finally updated through waveform inversion in the Laplace domain, and (c) of FIG. 14 shows a velocity model finally updated through waveform inversion in the Laplace-Fourier domain. The updated velocity model by the Laplace-Fourier-domain waveform inversion is the best among three results.

Figure 15:
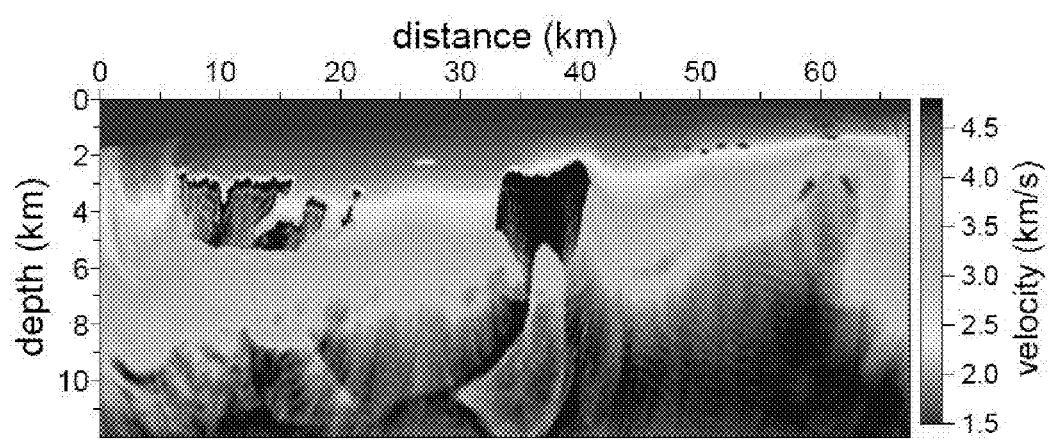
FIG. 15 shows another example of a velocity model finally updated through the frequency-domain waveform inversion, where the inverted velocity model by the Laplace-Fourier domain in FIG. 14 is used as an initial model.

FIG. 15 shows another example of a velocity model finally updated through waveform inversion. The velocity model of FIG. 15 is a result obtained by performing waveform inversion once more in the frequency domain when the velocity model obtained in (c) of FIG. 14 is set as an initial velocity model.

As seen in FIGS. 14 and 15, the velocity model obtained according to the exemplary embodiments is very similar to that of FIG. 9 which is assumed as the true velocity model. Particularly, a subsurface velocity model similar to the true velocity model can be obtained by applying waveform inversion in the Laplace-Fourier domain which can recover long- and medium-wavelength information that is not included in the field data. Also, waveform inversion is again performed in the frequency domain by using the Laplace-Fourier-domain inversion result as an initial model to recover short-wavelength information, thereby obtaining data more similar to the true velocity structure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for visualizing subsurface structure using waveform inversion in the Laplace-Fourier domain, the apparatus comprising a receiver receiving a seismic signal from a target region that is to be measured, and a signal processor processing the seismic signal to generate image data for visualizing the subsurface velocity structure of the target region, wherein
the signal processor comprises:
an input unit receiving time-domain measured data from the receiver;
a transformer transforming the time-domain measured data into Laplace-Fourier-domain measured data using a complex damping constant;
a modeled data generator setting up an equation including parameters representing physical characteristics and solving the equation in the Laplace-Fourier domain to obtain modeled data; and
a parameter update unit updating the parameters by comparing the Laplace-Fourier-domain measured data with the modeled data.

2. The apparatus of claim 1, wherein the complex damping constant comprises a Laplace damping constant as a real part and an angular frequency as an imaginary part.

3. The apparatus of claim 1, wherein the transforming unit multiplies a received time-domain measured wavefield by an exponential function having a complex damping constant, and integrates the result of the multiplication with respect to time.

4. The apparatus of claim 1, wherein the parameter comprises a velocity model, a velocity/density model or an impedance/density model for the target region.

5. The apparatus of claim 1, wherein the parameter update unit generates an objective function representing a difference between the Laplace-Fourier-domain measured data and the modeled data and updates the parameter to minimize the objective function.

6. The apparatus of claim 5, wherein the objective function is defined using logarithms of the Laplace-Fourier-domain measured data and the modeled data.

7. The apparatus of claim 5, wherein the objective function is defined using values of the p-th power of the Laplace-Fourier domain measured data and the modeled data, or values of the integration of the p-th power of the Laplace-Fourier domain measured data and the modeled data with respect to p.

8. The apparatus of claim 7, wherein p is equal to or less than 1.0.

9. The apparatus of claim 1, wherein the signal processor further comprises an image processor generating image data of the target region using the updated parameter, and displaying the image data on a display device.

10. A method for processing seismic data received from a target region to visualize subsurface velocity structure of the target region, the method comprising:
receiving time-domain measured data from the target region;
transforming the time-domain measured data into Laplace-Fourier-domain measured data using a complex damping constant;
setting up an equation including parameters representing physical characteristics of the target region and solving the equation in the Laplace-Fourier domain to obtain modeled data; and
updating the parameter by comparing the Laplace-Fourier domain measured data with the modeled data.

11. The method of claim 10, wherein the transforming of the time-domain measured data into the Laplace-Fourier domain measured data is performed using the following equation:

$$d(s) = \int_0^\infty d(t)e^{-st}\,dt = \int_0^\infty d(t)e^{-i\omega t}e^{-\sigma t}\,dt,$$

where d(s) denotes the Laplace-Fourier domain measured data, d(t) denotes the time-domain measured data, s denotes the complex damping constant, $\sigma$ denotes a Laplace damping constant, and $\omega$ denotes an angular frequency.

12. The method of claim 10, wherein the updating of the parameter is performed by defining an objective function representing a difference between the Laplace-Fourier domain measured data and the modeled data is defined, and updating the parameter to minimize the objective function.

13. The method of claim 12, wherein the objective function is defined using logarithms of the Laplace-Fourier domain measured data and the modeled data.

14. The method of claim 12, wherein the objective function is defined using values of the p-th power of the Laplace-Fourier domain measured data and the modeled data or using values of the integration of the p-th power of the Laplace-Fourier domain measured data and the modeled data with respect to p.

15. The method of claim 14, wherein p is equal to or less than 1.0.

16. The method of claim 10, further comprising visualizing and outputting an subsurface velocity structure of the target region using the updated parameter.

17. A non-transitory recording medium storing a program, the program comprising:
- receiving time-domain measured data;
- transforming the time-domain measured data into Laplace-Fourier-domain measured data using a complex damping constant;
- setting up an equation including an initial parameter and solving the equation in the Laplace-Fourier domain to obtain modeled data; and
- defining an objective function representing a difference between the measured data and the modeled data and updating the parameter to minimize the objective function.

* * * * *